UNITED STATES PATENT OFFICE.

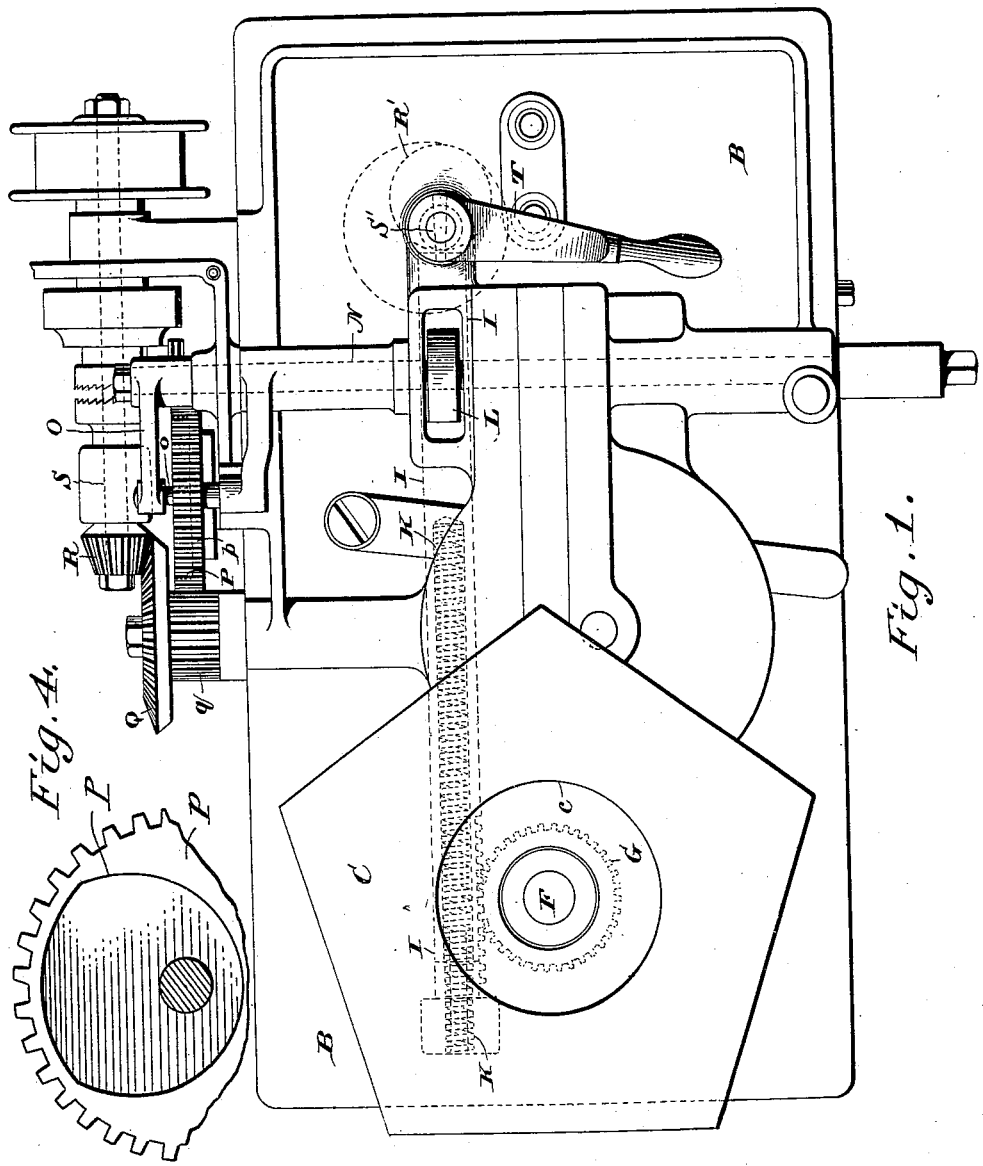
J. C. POTTER & J. JOHNSTON.
TURRET LATHE.
APPLICATION FILED MAR. 7, 1907.
991,886.
Patented May 9, 1911.
2 SHEETS—SHEET 1.

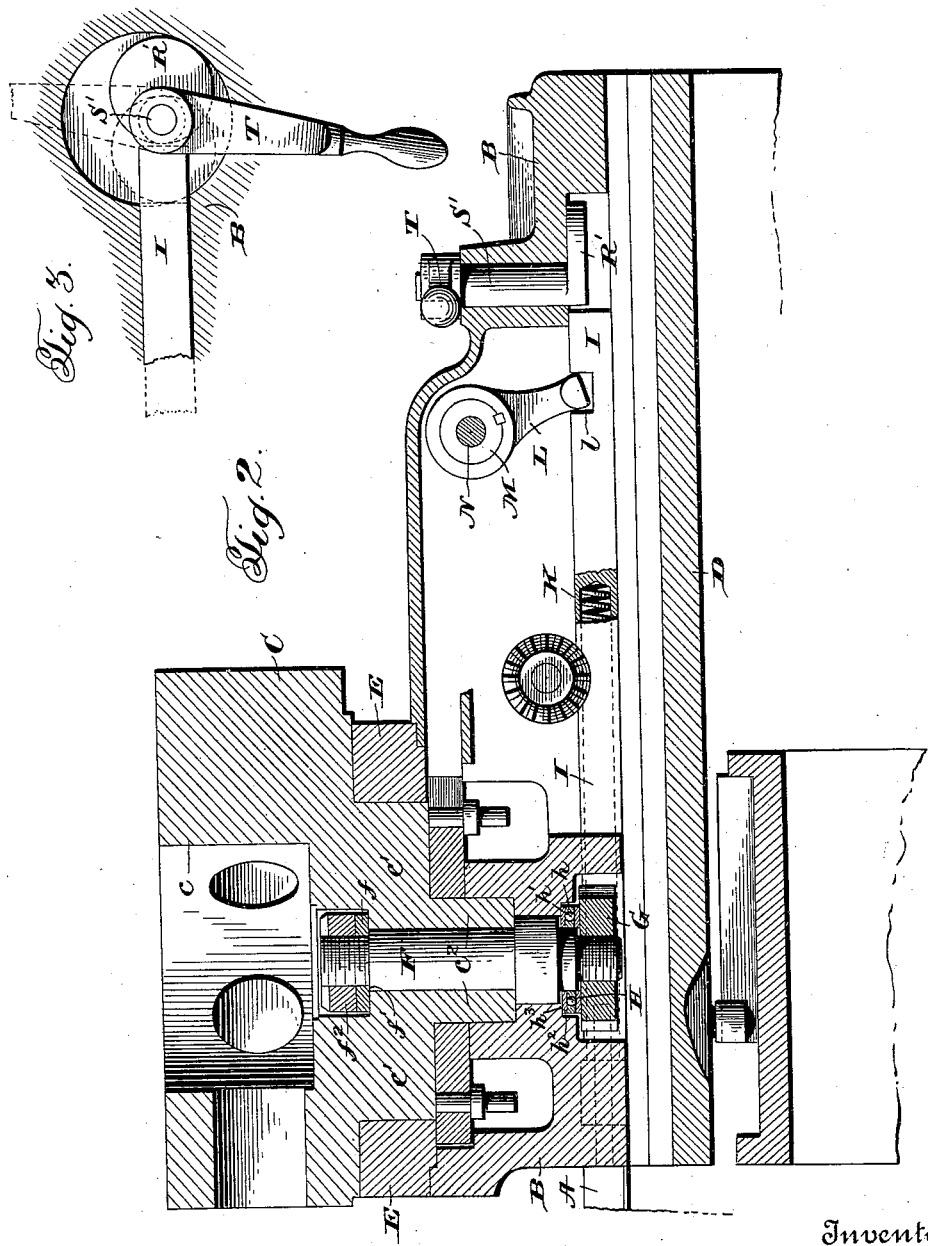

JAMES C. POTTER AND JOHN JOHNSTON, OF PAWTUCKET, RHODE ISLAND, ASSIGNORS TO POTTER & JOHNSTON MACHINE CO., OF PAWTUCKET, RHODE ISLAND, A CORPORATION OF RHODE ISLAND.

TURRET-LATHE.

991,886.  Specification of Letters Patent.  Patented May 9, 1911.

Application filed March 7, 1907. Serial No. 361,043.

*To all whom it may concern:*

Be it known that we, JAMES C. POTTER and JOHN JOHNSTON, of Pawtucket, in the county of Providence and in the State of Rhode Island, have invented a certain new and useful Improvement in Turret-Lathes, and do hereby declare that the following is a full, clear, and exact description thereof, reference being had to the accompanying drawings, in which—

Figure 1 is a top plan view of a portion of a turret lathe embodying our invention; Fig. 2 a vertical section thereof, and Fig. 3 a detail top plan view partly in section of our device for holding the turret clamping device in an unclamping position.

The object of our invention is to provide a simple and convenient device by which an automatic turret clamping and unclamping mechanism for automatic turret lathes may be secured in a position leaving the turret unclamped, so that the turret may be rotated by hand, and to this end our invention consists in the mechanism constructed substantially as hereinafter specified and claimed.

The embodiment of our invention we have selected for illustration is a turret lathe comprising a lathe bed A upon which is mounted a slide B, the slide resting directly on the ways of the lathe and carrying a turret C. Between the ways of the bed, a plate or bar D is reciprocated by any desired mechanism, preferably by means of a drum having cams secured to its periphery, such cams acting on a pin or roll secured to the bar D, whereby the bar is reciprocated at the speed and length of stroke which it is desired to give the turret.

The head $c$ of the turret C rests upon a ring E on the turret slide, and a neck $c'$ on the turret is journaled within such ring. A stem $c^2$ on the turret is journaled in the turret slide. A clamping bolt F is keyed in a hole in the bed and extends up through an axial hole in the turret stem. The upper end of the bolt carries a washer $f$ that is held against a shoulder $f'$ on the bolt by a nut $f^2$ that is locked on the bolt. On the lower end of the bolt F a nut G, in the form of a pinion, is threaded on the bolt; and such nut, on being screwed up, may be made to bear upon a hardened washer H, the latter supporting a ring $h$ having bearing balls $h'$ therein, upon which balls rests another hardened ring $h^2$. The ring $h^2$ is directly beneath a surface $h^3$ on the turret slide, against which surface the said ring is adapted to be forced by screwing up the pinion nut. This action causes the bolt F, and with it the turret, to be drawn down, so that the turret can be securely clamped to its slide.

The pinion nut G for clamping the turret to the turret slide is operated by a rack bar I, the thread of the nut being such that for locking movement the rack bar is moved to the right, as seen in Fig. 1. Such movement of the rack bar is caused by a spring K. When the pinion nut G is to be unlocked, the rack bar is moved in opposition to the spring K by a rock arm L that engages a notch $l$ formed in the rack bar, the said rock arm being keyed to a sleeve M that is mounted upon a shaft N. Said shaft extends transversely of the turret slide, and the sleeve is automatically rocked to move the clamp actuating bar in opposition to the spring by an arm O, which has a roller $o$ engaging a cam path P on the side of a gear $p$. The gear $p$ meshes with a pinion $q$ on a shaft which by a bevel gear Q and a pinion R receives motion from a pulley-driven shaft S. The proportion of the gearing is such that the cam $p$ which rocks the sleeve M revolves once for every station of the turret.

It is essential in the operation of the machine to enable the turret to be revolved by hand, and when it is to be revolved by hand the turret clamping device is secured in unclamping position. The means which we have invented for this purpose is an eccentric R carried by a vertical shaft S journaled in the turret slide, the eccentric being situated so that it can engage the end of the nut-actuating bar I when it is in its turret-unclamping position, and hold it in such position. For operating the eccentric for this purpose, the upper end of its shaft, which is extended beyond the opposite side of the turret slide, is provided with a handle T by which the eccentric may be turned to hold the clamp-operating bar in turret-unclamping position, or leave said bar free to act, said handle being moved through a half revolution for this purpose, and by the use of index marks on the slide it may serve to show whether the turret clamp-operating bar is free to move or is held in turret-unclamping position. The nut-actuating bar I may be secured by the eccentric in unclamping position after having been automatically moved thereto by the rocking of the arm L by means of the cam P; or the bar I may be moved by the eccentric to unclamping position. The eccentric, its shaft, and the operating handle being fixed to and carried by the turret slide is always at hand for operation, and consitutes a simple and efficient device.

Having thus described our invention, what we claim is:—

1. In a turret lathe, the combination of a turret, a turret clamping device, means automatically operating said clamping device, and separate means to hold the device in an unclamped position, said separate means being moved to and remaining in position to hold said device in unclamped position.

2. In a turret lathe, the combination of a turret, an automatic turret-clamping device including a reciprocating bar, a hand operated eccentric to coöperate with said bar to hold the device in turret-unclamping position.

3. In a turret lathe, the combination of a turret, a turret clamping device, automatic mechanism for operating said device including a reciprocating bar, and means coacting with said bar, and distinct from the automatic mechanism, to hold the turret clamping device in unclamping position.

4. In a turret lathe, the combination of a turret, an automatic clamping device embracing a pinion and rack bar, an eccentric to coact with the rack bar, unconnected with said bar, and a handle to turn the eccentric.

5. In a turret lathe, the combination of a turret, a slide supporting the same, an automatic clamping device including a reciprocating bar, an eccentric to coact with said bar, unconnected with said bar, a shaft mounted in the slide, to which shaft the eccentric is attached, and a handle on the shaft to turn the eccentric.

6. In a turret lathe, the combination of a turret, an automatic clamping device for the turret embracing a pinion connected with a member of the clamping device, and a rack bar, a spring for moving the rack bar in one direction, a cam-operated lever for moving it in the opposite direction, and a rack bar-engaging eccentric, said eccentric being shiftable to either of two positions, one for holding the turret unlocked, and the other rendering the eccentric ineffective.

7. In a turret lathe, the combination of a turret, an automatic clamping device including a reciprocating bar, a slide to which said bar is movably connected, and a hand-operated eccentric pivoted to the slide and situated in the path of movement of the bar, and movable into and out of position to engage said bar.

In testimony that we claim the foregoing we have hereunto set or hands.

JAMES C. POTTER.
JOHN JOHNSTON.

Witnesses:
EARL H. ROBERTS,
HENRY A. ALDRICH.

---

Copies of this patent may be obtained for five cents each, by addressing the "Commissioner of Patents, Washington, D. C."